United States Patent
Van Der Merwe et al.

(10) Patent No.: US 9,250,319 B2
(45) Date of Patent: Feb. 2, 2016

(54) FLOODLIGHT RADAR SYSTEM FOR DETECTING AND LOCATING MOVING TARGETS IN THREE DIMENSIONS

(75) Inventors: Paulus Jacobus Van Der Merwe, Durbanville (ZA); Pieter Willem Van Der Walt, Stellenbosch (ZA)

(73) Assignee: REUTECH RADAR SYSTEMS (PROPRIETARY) LIMITED, Stellenbosch (ZA)

(*) Notice: Subject to any disclaimer, the term of this patent is extended or adjusted under 35 U.S.C. 154(b) by 169 days.

(21) Appl. No.: 13/819,354
(22) PCT Filed: Jul. 19, 2011
(86) PCT No.: PCT/IB2011/053209
§ 371 (c)(1), (2), (4) Date: Feb. 27, 2013
(87) PCT Pub. No.: WO2012/052856
PCT Pub. Date: Apr. 26, 2012

(65) Prior Publication Data
US 2013/0194128 A1 Aug. 1, 2013

(30) Foreign Application Priority Data
Oct. 21, 2010 (ZA) ..................... 10/7525

(51) Int. Cl.
*G01S 13/58* (2006.01)
*G01S 13/72* (2006.01)
(Continued)

(52) U.S. Cl.
CPC ............ *G01S 13/58* (2013.01); *G01S 13/582* (2013.01); *G01S 13/72* (2013.01); *H01Q 13/065* (2013.01); *H01Q 19/06* (2013.01)

(58) Field of Classification Search
CPC ......... G01S 13/02; G01S 13/50; G01S 13/58; G01S 13/581; G01S 13/582; G01S 13/66; G01S 13/72; H01Q 13/00; H01Q 13/06; H01Q 13/065; H01Q 19/00; H01Q 19/06

USPC ............... 342/27, 28, 59, 104–115, 118, 342/146–164, 175, 13, 70–81, 189–197, 342/350, 368, 371–373
See application file for complete search history.

(56) References Cited

U.S. PATENT DOCUMENTS 3,795,911 A * 3/1974 Hammack ............... 342/106
3,825,928 A * 7/1974 Williams ................ 342/158
(Continued)

FOREIGN PATENT DOCUMENTS

JP 2009-069124 4/2009

OTHER PUBLICATIONS

International Search Report for PCT/IB2011/053209 Dated Dec. 16, 2011.

*Primary Examiner* — Bernarr Gregory
(74) *Attorney, Agent, or Firm* — Nixon Peabody LLP; Jeffrey L. Costellia

(57) ABSTRACT

A floodlight radar system includes a transmitter arranged to generate output waveforms at first and second centre frequencies, and at least one transmit antenna configured to illuminate a search volume constantly at the first and second centre frequencies. A sparse array of receive antennas is arranged in a common plane and configured to monitor the search volume constantly. The system includes a receive circuit arranged to extract target position information from return signals received by each antenna, and a signal processor circuit which is arranged to resolve ambiguity in the position information using a known relationship between calculated Doppler spectra, wavelengths and phase differences at the first and second frequencies, to calculate azimuth, elevation, range and velocity of a target identified in the search volume. The system is able to rapidly detect and locate multiple fast moving targets in three dimensions.

23 Claims, 9 Drawing Sheets

(51) Int. Cl.
   *H01Q 13/06*   (2006.01)
   *H01Q 19/06*   (2006.01)
   *G01S 13/00*   (2006.01)

(56) References Cited

U.S. PATENT DOCUMENTS

| | | | |
|---|---|---|---|
| 3,842,417 A * | 10/1974 | Williams | 342/158 |
| 3,953,856 A * | 4/1976 | Hammack | 342/191 |
| 3,978,482 A * | 8/1976 | Williams et al. | 342/157 |
| 4,184,154 A | 1/1980 | Albanese et al. | |
| 4,633,261 A * | 12/1986 | Kosaka et al. | 342/189 |
| 4,689,627 A * | 8/1987 | Lee et al. | 342/373 |
| 4,751,511 A * | 6/1988 | Komata et al. | 342/59 |
| 4,868,574 A * | 9/1989 | Raab | 342/81 |
| 4,942,403 A * | 7/1990 | Yokoyama | 342/372 |
| 5,132,690 A | 7/1992 | Martin | |
| 5,381,156 A * | 1/1995 | Bock et al. | 342/59 |
| 6,486,827 B2 * | 11/2002 | Small | 342/13 |
| 6,636,174 B2 * | 10/2003 | Arikan et al. | 342/195 |
| 6,750,810 B2 * | 6/2004 | Shinoda et al. | 342/149 |
| 7,242,342 B2 * | 7/2007 | Wu et al. | 342/195 |
| 7,280,068 B2 * | 10/2007 | Lee et al. | 342/27 |
| 7,489,266 B2 * | 2/2009 | Ohtake et al. | 342/196 |
| 7,573,419 B2 * | 8/2009 | Falk | 342/147 |
| 8,144,049 B2 * | 3/2012 | Mizutani et al. | 342/147 |
| 2003/0112172 A1 * | 6/2003 | Shinoda et al. | 342/149 |
| 2009/0073026 A1 | 3/2009 | Nakagawa | |

\* cited by examiner

FLOODLIGHT RADAR SYSTEM FOR DETECTING AND LOCATING MOVING TARGETS IN THREE DIMENSIONS

BACKGROUND OF THE INVENTION

THIS invention relates to a floodlight radar system for detecting and locating moving targets in three dimensions.

When a radar system with the capability to rapidly detect and locate fast-moving targets in three dimensions anywhere in the search volume is required, a floodlight radar is an appropriate choice.

Without scanning its beam (either mechanically or electronically), a floodlight radar transmitter continuously illuminates the full search volume by means of a single wide beam antenna. Detection and location of targets in three dimensions is accomplished by appropriately processing the signals received with multiple receive antennas.

Floodlight radars, as described by W Wirth, Radar techniques using array antennas, IEE, 2001, pp. 419-447, have a long legacy. The first operational air-warning system, the Chain Home network built in Britain before the second world war, was a pulsed floodlight system described in British patent GB 593 017 of R Watt. The floodlight principle is also known under other names, such as Array Signal Processing (ASP)—see A. Rudge, K. Milne, A. Olver, and P. Knight, Eds., The Handbook of Antenna Design, Volume 2, Peter Peregrinus, London, U.K., 1983, pp. 330-456.

In a floodlight radar, the transmitter "floods" the search volume with electromagnetic waves radiated from the transmit antenna. This is in contrast to a scanned radar, where an antenna directs a scanned pencil or fan beam to one or more small parts of the search volume at any one instant. The floodlight radar therefore simultaneously illuminates all targets in the scan volume at all times. The radiation patterns of the individual antennas of the multiple-channel receiver also cover the complete search volume. The antenna system is often referred to as a staring array. These characteristics of a floodlight radar are the keys to the rapid detection of fast-moving targets anywhere in the search volume.

The receive antennas can either be arranged as a densely or sparsely packed phased array forming multiple simultaneous beams, as described by F. Athley, C. Engdahl, and P. Sunnergren, "On radar detection and direction finding using sparse arrays," Aerospace and Electronic Systems, IEEE Transactions on, vol. 43, no. 4, pp. 1319-1333, October 2007, or as a sparsely packed interferometer array. The vertical and horizontal dimensions of the array determine the accuracy with which elevation and azimuth angles of arrival can be estimated.

The densely packed array has the advantage that simultaneous beams covering the full search volume can be formed by means of ASP, with each beam providing a high antenna gain on receive. It is, however, a complex and costly system. A radar with a square array with dimensions of 5 wavelengths on a side covering a search volume of a quarter hemisphere will typically use a 64 channel receiver and a 64 channel signal processor.

The sparsely packed array has the advantage that simultaneous beams covering the full search volume can be formed by means of ASP, with each beam providing a high antenna gain on receive, but has the disadvantage that grating lobes are also formed. Various techniques have been devised to identify and eliminate returns from targets in grating lobes as described in U.S. Pat. No. 7,692,575 of Nishimura.

The sparse interferometer receive array does not form beams. It has the advantage of a lower hardware count for a given accuracy of location, but suffers the disadvantage of angular ambiguities, where targets at different locations can produce similar antenna responses. It requires special measures to resolve these ambiguities, one of which is to use overlapping high gain antennas, but this severely limits the search volume. The sparse array with wide-beam radiators has much lower directivity than the densely packed array. To overcome the disadvantage of low gain, the transmitter power must be increased with respect to that needed for a densely packed receive array.

Conventional single-frequency direction-finder technology to resolve angular ambiguities is well-known, but requires at least five antennas arranged in two dimensions to resolve angular ambiguities in azimuth and elevation. See E. Jacobs and E. Ralston, "Ambiguity resolution in interferometry," Aerospace and Electronic Systems, IEEE Transactions on, vol. AES-17, pp. 766-780, 1981.

It is an object of the invention to provide a floodlight radar system that overcomes at least some of the above mentioned problems and is suitable for detecting and locating moving targets in three dimensions.

SUMMARY OF THE INVENTION

According to the invention there is provided a floodlight radar system including:
- a transmitter arranged to generate output waveforms at first and second centre frequencies;
- at least one transmit antenna configured to illuminate a search volume constantly at the first and second centre frequencies;
- a sparse array of receive antennas arranged in a common plane and configured to monitor the search volume constantly;
- a receive circuit arranged to extract target position information from return signals received by each antenna; and
- a signal processor circuit arranged to resolve ambiguities in the position information using a known relationship between calculated Doppler spectra, wavelengths and phase differences at the first and second frequencies, to calculate azimuth, elevation, range and velocity of a target identified in the search volume.

The sparse array of receive antennas preferably comprises at least one set of three receive antennas.

The sparse array of receive antennas may comprise two sets of three receive antennas, one set for each centre frequency.

The three receive antennas may be arranged at the vertices of an equilateral triangle.

The spacing between adjacent antennas may be indicated by the expression $s=k\lambda$, where s is the spacing, $\lambda$ is the wavelength at the operating frequency of the antennas and k is a value larger than 1.

Preferably, k has a value of approximately between 1 and 5. In one example embodiment, k may have a value of approximately 5. In another example embodiment, k may have a value of approximately 2.5. In yet a further example embodiment, k may have a value of 3.

The transmitter may be arranged to produce a modulated continuous waveform or alternatively to produce a pulsed waveform.

Preferably, the transmitter is arranged to produce a continuous wave waveform.

The transmitter may be arranged to generate output waveforms at the first and second centre frequencies alternately.

Instead, the transmitter may be arranged to generate output waveforms at the first and second centre frequencies simultaneously.

In the first case, each receive antenna may have a single receive channel capable of processing return signals at one or both centre frequencies alternately.

In the latter case, each receive antenna may have an associated pair of receive channels for the processing of return signals at the first and second centre frequencies simultaneously.

Alternatively, when using separate receive arrays for each frequency, each receive antenna may have a single receive channel for the processing of return signals at either the first or second centre frequency.

The signal processor is preferably arranged to sample the return signals from each antenna at each of the two frequencies in the time domain.

In the case of a pulse modulated waveform, each sample, after pulse compression if required, represents a range bin.

In the case of a continuous wave waveform, the signal processor preferably calculates the discrete Fourier spectrum of the signal, where each discrete component of the transform represents a range bin.

The signal processor may calculate discrete Doppler spectra for each range bin from a large number of observations.

The signal processor is preferably arranged to detect targets by comparing the Doppler spectra for each range bin to the noise in the spectra when no target is present.

The signal processor may be arranged to accurately interpolate the range of the target by comparing amplitude returns from the target in adjacent range bins.

The signal processor may be arranged to accurately interpolate the radial velocity of the target by comparing amplitude returns from the target in adjacent Doppler bins.

Each detected target is preferably associated with a track according to its range and velocity information.

The signal processor is preferably arranged to compare the phase returns of each detected target from each of the antennas. The respective phase differences are used to determine the angular location of each target in azimuth and elevation.

The signal processor is preferably arranged to resolve angular ambiguities resulting from the wide antenna spacing by comparing the phase differences between measurements of the same target at the two centre frequencies.

The signal processor may be arranged to use redundant information gained from the receiver channels to estimate and indicate the quality of the angular measurement.

The signal processor may be arranged to distinguish between inbound, outbound and other ambiguous velocities by comparing the Doppler spectra of the target at the two centre frequencies.

DESCRIPTION OF EMBODIMENTS

The system described herein is a unique floodlight radar with a sparse interferometer receive array using only three receive antennas, that resolves target angular ambiguities in a spherical coordinate system by means of frequency diversity. The receive antennas are arranged in two dimensions and ambiguity resolution is typically accomplished by taking measurements at two frequencies.

The radar also assesses the quality of its measurements and identifies suspect measurements that were degraded due to noise or propagation anomalies such as multipath.

The Receive Array and the Principle of Ambiguity Resolution

Figure 1:
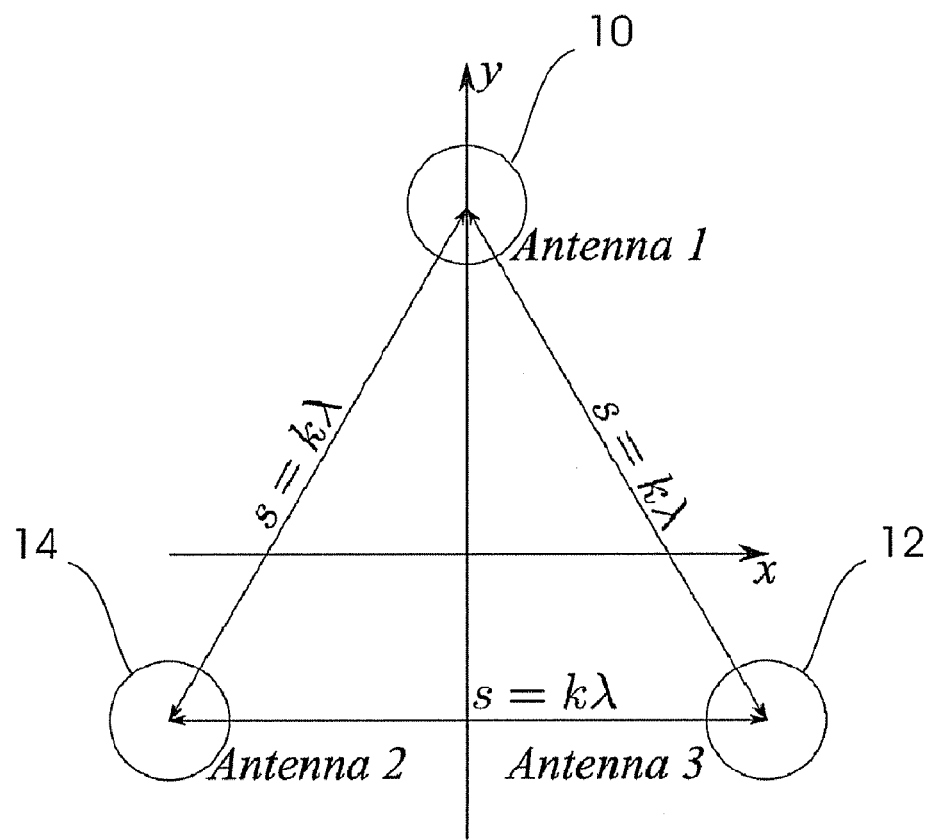
FIG. 1 is a schematic diagram showing the configuration of a sparse receive array, consisting of three widely spaced antennas, forming part of a floodlight radar system according to the invention.

The receive array of the radar system described herein is at the core of the system concept and is shown schematically in FIG. 1, where a receive antenna 10, 12, 14 is placed at each vertex or corner of an equilateral triangle. This is not the only possible arrangement of the antennas. They could, for instance, also be arranged at the vertices or corners of a right-angled triangle or, in general, at the corners of an irregular triangle. The antennas are spaced several wavelengths apart, at a spacing $s=k\lambda$. Preferably, k is greater than 1 and most preferably falls in the range 4 to 7. A typical spacing for the equilateral arrangement is five wavelengths, or $s=5\lambda$ (i.e. a value of k of approximately 5).

Figure 2:
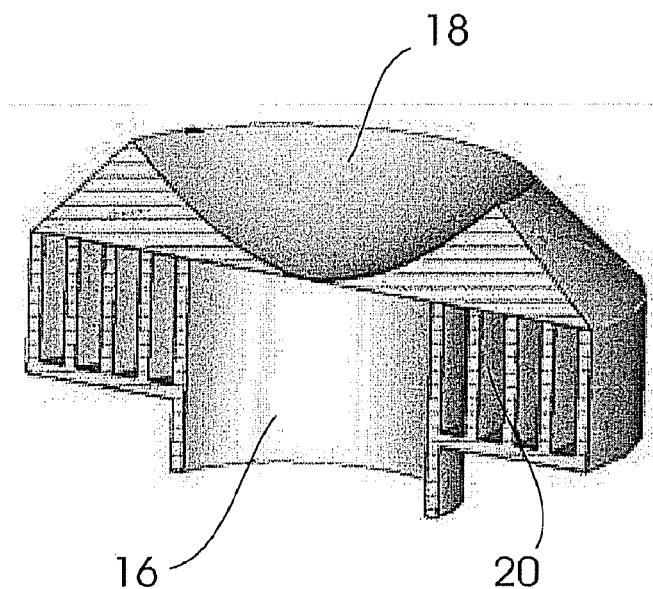
FIG. 2 is a partially cut away pictorial view of a typical antenna element used in the receive array and as a transmit antenna, which will provide coverage over more than an eighth of a hemisphere.

The three receive antennas for each centre frequency are preferably identical, a typical implementation of one such antenna being shown in FIG. 2. The illustrated antenna has a central circular waveguide feed 16 and a dielectric lens 18, with a peripheral isolation choke 20. A fourth similar antenna is used as a transmit antenna. This could either be a separate antenna or one of the receive antennas could double for this purpose.

Figure 3:
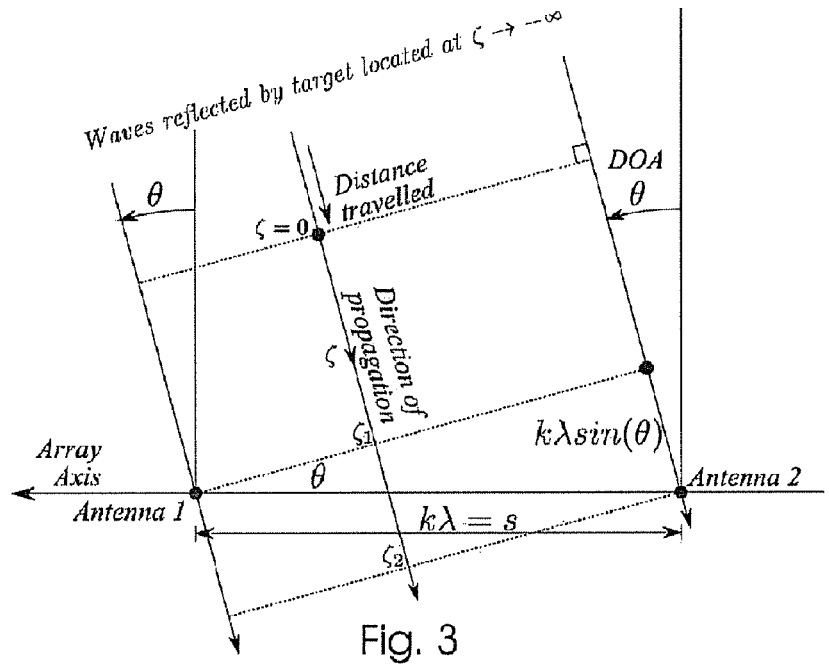
FIG. 3 is a schematic diagram which illustrates the principle by which the Direction of Arrival of an incoming plane wave signal is determined along one axis of the antenna array.

An array as shown in FIG. 1 can be used to determine the direction of arrival (DOA) of an incoming signal, according to the principle shown in FIG. 3. Let a plane wave varying sinusoidally with time and emanating from a source far away from the antenna array impinge upon the array from a direction θ with respect to a line perpendicular to the line connecting the phase centres of two identical antennas. Depending on the magnitude of the angle θ, there will be a path length difference $k\lambda\sin(\theta)$ from the source to the $2^{nd}$ antenna 12 with respect to the path length from the source to the $1^{st}$ antenna 10. The instantaneous phase angle of the electric field vector is a function of time and distance travelled according to the equation $$E(t,\varsigma) = E(\varsigma)\cos(\phi(t,\varsigma)) = E(\varsigma)\cos\left(\omega t - \frac{2\pi}{\lambda}\varsigma + \phi_0\right).$$

In this equation, $\varsigma$ is the distance travelled in the direction of propagation, $E(\varsigma)$ is the peak magnitude of the electrical field vector, $\omega=2\pi f$ is the frequency in radians/second for a wave oscillating with a frequency f Hz, $\lambda$ is the wavelength of the wave, given by $$\lambda = \frac{2\pi c}{\omega} = \frac{c}{f}$$

where c is the velocity of propagation and $\phi_0$ is the instantaneous phase angle at time t=0 and position $\varsigma=0$.
There will consequently at any given instant be a difference in the phase angles of the signals emanating from the two antennas, given by $$\Delta\phi_{u12} = \phi_1(t,\varsigma_1) - \phi_2(t,\varsigma_2) = \frac{2\pi}{\lambda}(\varsigma_2-\varsigma_1) = 2k\pi\sin(\theta),$$

where subscript 1 refers to the $1^{st}$ antenna 10 and subscript 2 refers to the $2^{nd}$ antenna 12.
It is convenient to substitute a new variable u for the function $\sin(\theta)$, so that $$\Delta\phi_{u12}=2k\pi u.$$

The variable u has a range $[-1 \leq u \leq 1]$. All angles are measured modulo $2\pi$, in the range $[-\pi < \phi \leq \pi]$. Therefore, if k>0.5, $\Delta\phi_{u12}$ can fall outside the measurable range and wraps back to a measured phase difference $$\Delta\phi_{m12}=\Delta\phi_{u12}-2\pi p,$$

where p is, in general, an unknown positive or negative integer. As a consequence, the determination of u and eventually θ from a measurement $\Delta\phi_{m12}$ is ambiguous.
For the sparse array considered here, with k of the order of 5, $\Delta\phi_{m12}$ can wrap up to four times when $$\left[-\frac{\pi}{2} < \theta < \frac{\pi}{2}\right].$$

The true phase difference must therefore be written as $$\Delta\phi_{u12}=2k\pi u=\Delta\phi_{m12}+2\pi p,$$

where p is unknown. For k=5, p takes on integer values in the range $[-2 \leq p \leq 2]$.

For an unambiguous determination of the arrival angle θ, some means must be found to determine p. In the radar system described here, p is determined by repeating the phase difference measurement at a second frequency. See M. Skolnik, "Resolution of angular ambiguities in radar array antennas with widely-spaced elements and grating lobes," Antennas and Propagation, IRE Transactions on, vol. 10, no. 3, pp. 351-352, May 1962. The author describes the use of measurements at two frequencies to identify and eliminate echoes from targets in grating lobes of a scanning radar with a sparse array antenna. This in effect changes the electrical antenna spacing.
With subscripts a and b referring to frequency a and frequency b, we have $$k_a\lambda_a=k_b\lambda_b=s$$

$$\Delta\phi_{u12a}=2\pi k_a u=\Delta\phi_{m12a}+2\pi p_a$$

$$\Delta\phi_{u12b}=2\pi k_b u=\Delta\phi_{m12b}+2\pi p_b$$

Taking the difference of the phase angles yields $$\Delta\phi_{12_{ab}} = \Delta\phi_{u12_a} - \Delta\phi_{u12_b} = 2\pi(k_a-k_b)u,$$

where $$k_a - k_b = \frac{s}{\lambda_a} - \frac{s}{\lambda_b} = \frac{s}{c}(f_a - f_b).$$

We note that if $$|k_a-k_b| \leq \frac{1}{2},$$

then $$[-\pi \leq \Delta\phi_{12ab} \leq \pi].$$

Consequently, if $$|k_a-k_b| \leq \frac{1}{2},$$

$\phi_{12_{ab}}$ cannot wrap and a determination of u from $\Delta\phi_{12_{ab}}$ is unambiguous. (Note that, if the coverage of the antenna is smaller than $$\left[-\frac{\pi}{2} < \theta < \frac{\pi}{2}\right],$$

the range of u decreases and the spacing between the antennas can be increased without introducing ambiguity.)
In practice, the determination of u from $\Delta\phi_{12_{ab}}$ is not very accurate and also quite noisy. Our approach is therefore to determine a coarse estimate of u from $\Delta\phi_{u12_{ab}}$, and then to use this coarse estimate to find an estimate for the correct values of integers $p_a$ and $p_b$.
We then use these estimates of $p_a$ and $p_b$ to find a more accurate value of u using $\Delta\phi_{12_a}$ and $\Delta\phi_{12_b}$. Effects such as noise, multipath and interference generally affect the phase angles of the two frequencies in ways that do not follow the defined relationship. This results in the values of u calculated with the two frequencies to differ. When an incorrect value is found for $p_a$ and/or $p_b$, the difference between the two values of u can become large. This difference is used as the axis angle input for the confidence parameter that is described below. Note that this difference is calculated for each of the three axes.

3D Target Location

We determine the 3-dimensional target location with reference to a coordinate system centred on the antenna array with the x-y axes in the plane of the array, as shown in FIG. 1. The z-axis is perpendicular to the array in the direction of radiation.

Figure 4:
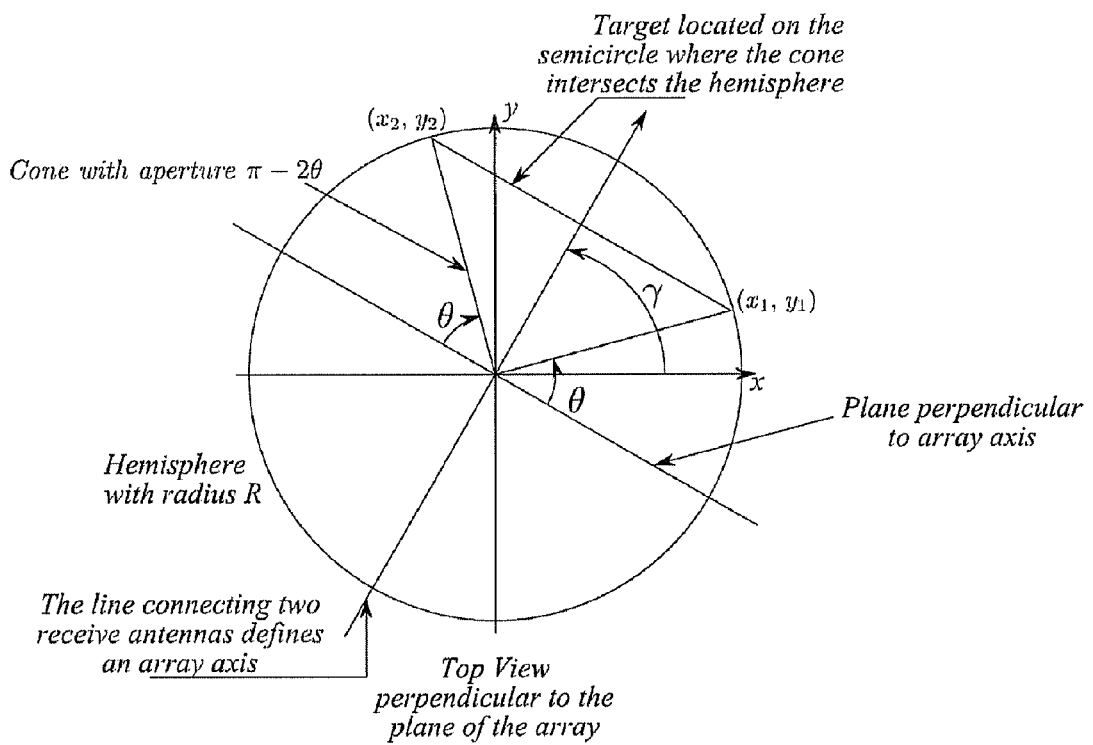
FIG. 4 is a schematic diagram showing how the target position is arrived at by using a DOA measurement along one axis of the antenna array.

To locate a target in three dimensions with the array, first consider the determination of target position from a measurement taken from two antennas. The line connecting the antennas, called an array axis, is inclined at an angle γ to the x axis. The target is detected at range R with its DOA θ determined with respect to the plane perpendicular to the array axis, as shown in FIG. 4. The target must lie on a circle on the surface of the right circular cone with aperture (π−2θ) with its apex at the centre of the array, at a distance R from the apex. We note that the target must also lie somewhere on the hemisphere with radius R. The intersection of the cone and hemisphere is a semicircle, the plane of which is perpendicular to the array axis and therefore also to the plane of the array. The semicircle intersects the plane of the array at the points $(x_1, y_1)$ and $(x_2, y_2)$, given by $$x_1 = R\cos\left(\gamma + \theta - \frac{\pi}{2}\right)$$
$$= R\sin(\gamma + \theta)$$
$$y_1 = -R\cos(\gamma + \theta)$$
$$x_2 = -R\sin(\gamma - \theta)$$
$$y_2 = R\cos(\gamma - \theta).$$

Solving for the equation of the line connecting $(x_1, y_1)$ and $(x_2, y_2)$, we find that the (x,y) coordinates of the target must lie on the line $$x = -\tan(\gamma)y + R\frac{\sin(\theta)}{\cos(\gamma)}$$

Figure 5:
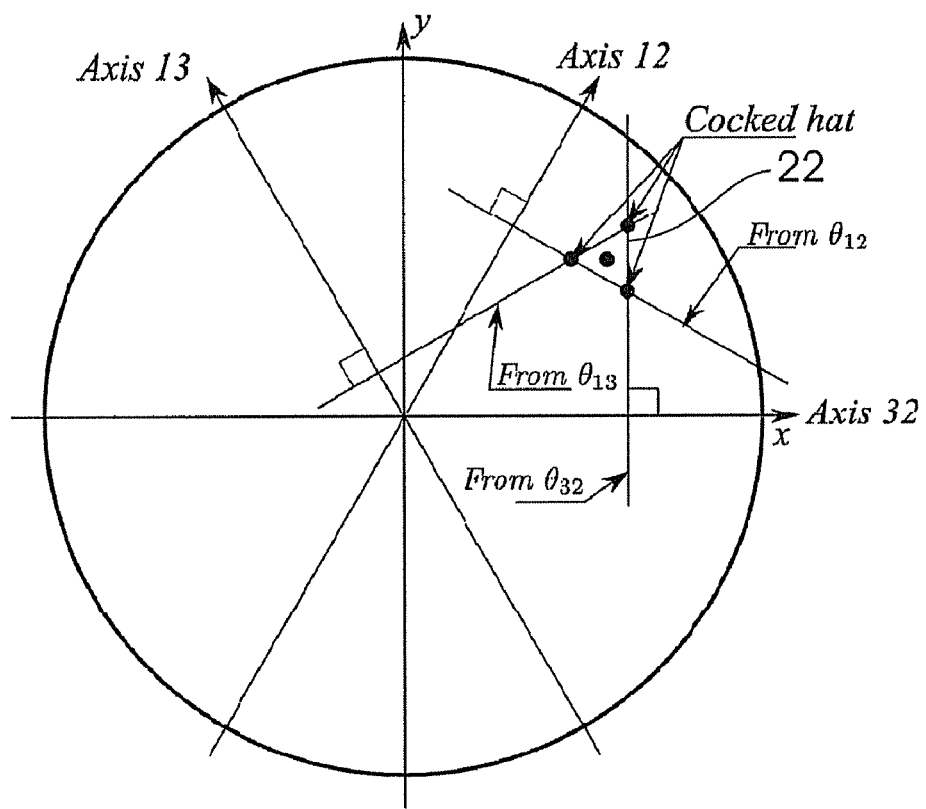
FIG. 5 is a schematic diagram showing how the 3D target position is arrived at by using DOA measurements along the three axes of the antenna array.

Two further estimates of location lines in the x-y plane are obtained from measurements along the other two axes of the array, as shown in FIG. 5. For the specific antenna arrangement of FIG. 1, where the antennas are placed at the corners of an equilateral triangle, we have the following equations for the three location lines given by the DOA angle $\theta_{12}$ determined from the signal phase differences from the $1^{st}$ antenna 10 with respect to the $2^{nd}$ antenna 12 (γ=60°), $\theta_{32}$ from the $3^{rd}$ antenna 14 with respect to the $2^{nd}$ antenna 12 (γ=0) and $\theta_{13}$ from the $1^{st}$ antenna 10 with respect to the $3^{rd}$ antenna 14 (γ=120°):

$$x = -\sqrt{3}y + 2R\sin(\theta_{12})$$

$$x = R\sin(\theta_{32})$$

$$x = \sqrt{3}y + 2R\sin(\theta_{13}).$$

Three equations (as represented by the three location lines) are therefore available to solve only two unknowns (x and y), resulting in an overdetermined system. Under ideal conditions, the three lines cross in a single point. In practice, factors such as interference, multipath or noise can cause the system to become inconsistent and the lines then define a triangular area 22, called a cocked hat, within which the target is assumed to be located. After solving for the three corners of the cocked hat, various possibilities must be evaluated. For instance, two of the lines may be correctly resolved, in which case one of the corners of the cocked hat is the best estimate of the position. The history of previous measurements (i.e. an established track) may be used to identify such a solution. If no other information is available to identify the best solution, the centroid of the triangle may be used as the best estimate of target position. The centroid lies at $$x_c = \frac{2\sin(\theta_{32}) + \sin(\theta_{12}) - \sin(\theta_{13})}{3}R$$
$$y_c = \frac{\sin(\theta_{13}) + \sin(\theta_{12})}{\sqrt{3}}R.$$

The solution for the centroid in terms of the variables $$u_{ij} = \sin(\theta_{ij})$$

is given by $$x_c = \frac{2u_{32} + u_{12} - u_{13}}{3}R$$
$$y_c = \frac{u_{13} + u_{12}}{\sqrt{3}}R.$$

With the (x, y) coordinates of the target determined, the z-coordinate is found from the relationship between the coordinate positions and the range, $$R^2 = x^2 + y^2 + z^2,$$

as $$z_c = \sqrt{R^2 - x_c^2 - y_c^2}$$

The size of the cocked hat is a useful indicator of the reliability of the measurement and serves as the 3D angle input to the confidence parameter, described in the next section. The side of the cocked hat normalized to unity range is given by $$s = \frac{2}{\sqrt{3}}|u_{13} + u_{32} - u_{12}|.$$

The proportionality constant is not of importance, so that the parameter $$\text{Rel\_size} = |u_{13} + u_{32} - u_{12}|$$

is used as an indicator of the size of the cocked hat.

The Confidence Parameter

The quantity u for a specific antenna axis is calculated from the phase difference for each frequency (e.g. $\Delta\phi_{12a}$ and $\Delta\phi_{12b}$), using the estimates for $p_a$ and $p_b$.

$$u_a = \frac{\Delta\phi_{m12a}}{2\pi k_a} + \frac{p_a}{k_a}$$
$$u_b = \frac{\Delta\phi_{m12b}}{2\pi k_b} + \frac{p_b}{k_b}$$

Small errors $\epsilon_{12a}$ and $\epsilon_{12b}$ in the phase difference measurements $\Delta\phi_{m12a}$ and $\Delta\phi_{m12b}$ will cause errors $$\frac{\epsilon_{12a}}{2\pi k_a} \text{ and } \frac{\epsilon_{12b}}{2\pi k_b}$$

in the calculated values for u. The resultant error in u with typical values for $k_a$ and $k_b$ is generally within the accuracy limits of the system. A phase difference error large enough to cause the integers ($p_a$ or $p_b$) to be incorrectly resolved will, however, result in a discrete and significant error in the calculated value of u. This allows for binary indicators to be set up for monitoring the reliability of the angle extraction.

The confidence calculation is based on four inputs: three axis angle inputs (differences in calculated values of u) as well as a 3D angle input given by the relative size of the cocked hat. Four binary indicator outputs can then be calculated: the three axis angle confidence indicators and the 3D angle confidence indicator. These four outputs can then be suitably combined to arrive at a single confidence parameter.

Three Axis Angle Confidence Indicators

The large, discrete difference between $u_a$ and $u_b$ can be used as a binary indication of whether an integer $p_a$ or $p_b$ has been estimated incorrectly. This indicator is available for each of the three antenna axes. It may occasionally happen that the phase difference errors on the two frequencies are such that $u_a$ and $u_b$ remain in agreement, e.g. when both $p_a$ and $p_b$ are estimated incorrectly, in which case an error will not be indicated.

Single 3D Angle Confidence Indicator

An incorrect estimation of $p_a$ or $p_b$ that causes u to be incorrectly calculated on an axis will shift the location line associated with that axes. This will increase the size of the cocked hat by a discrete amount, which can again be used as a binary indication of a suspect angle extraction.

Usage

The confidence indicators are used as inputs to the tracking algorithm and are also made available to the user of the system.

Example of a System Embodiment

The Transceiver

Figure 6:
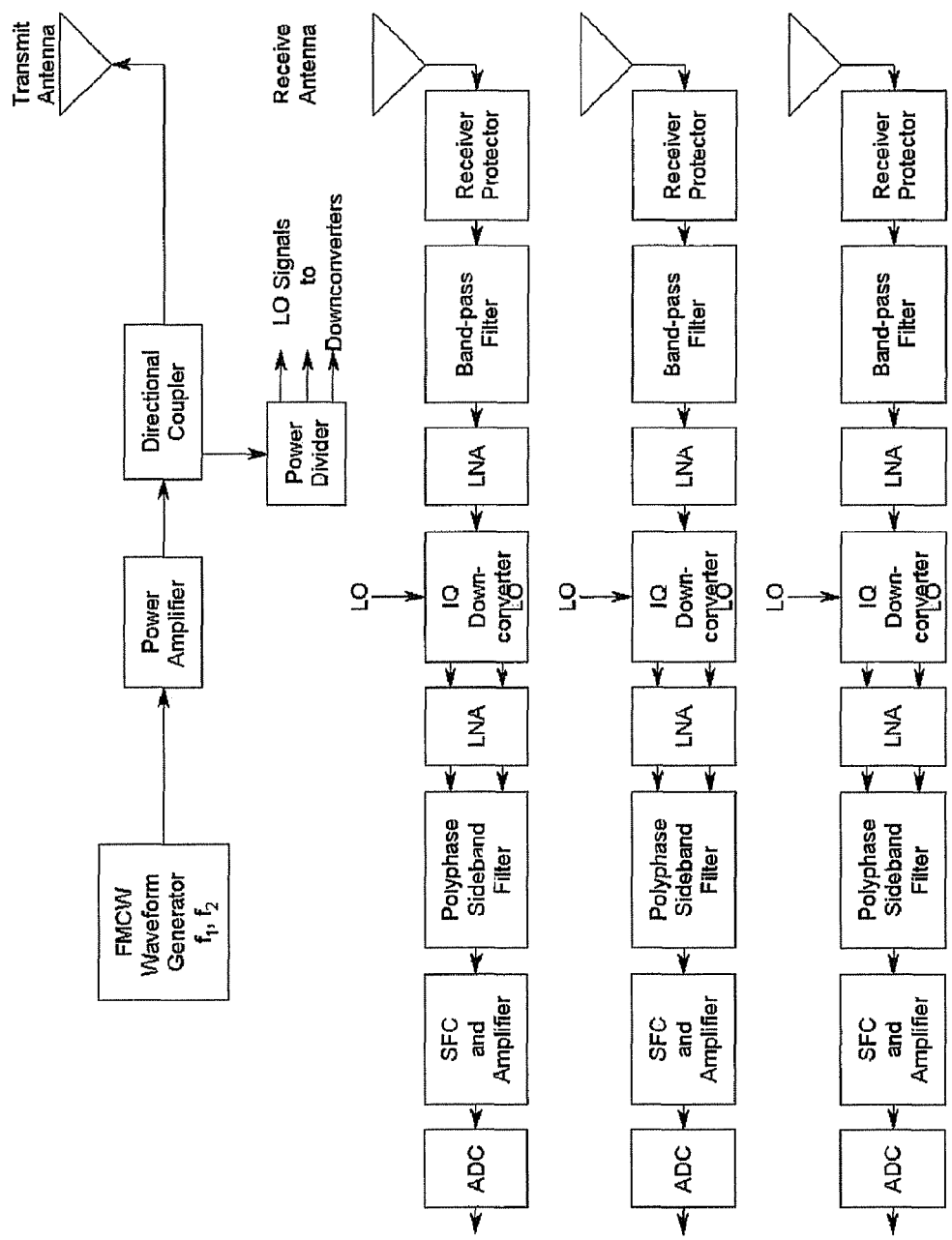
FIG. 6 is a block diagram of a transceiver for a floodlight radar system according to an example embodiment of the invention, with multiplexed receive channels.
Figure 7:
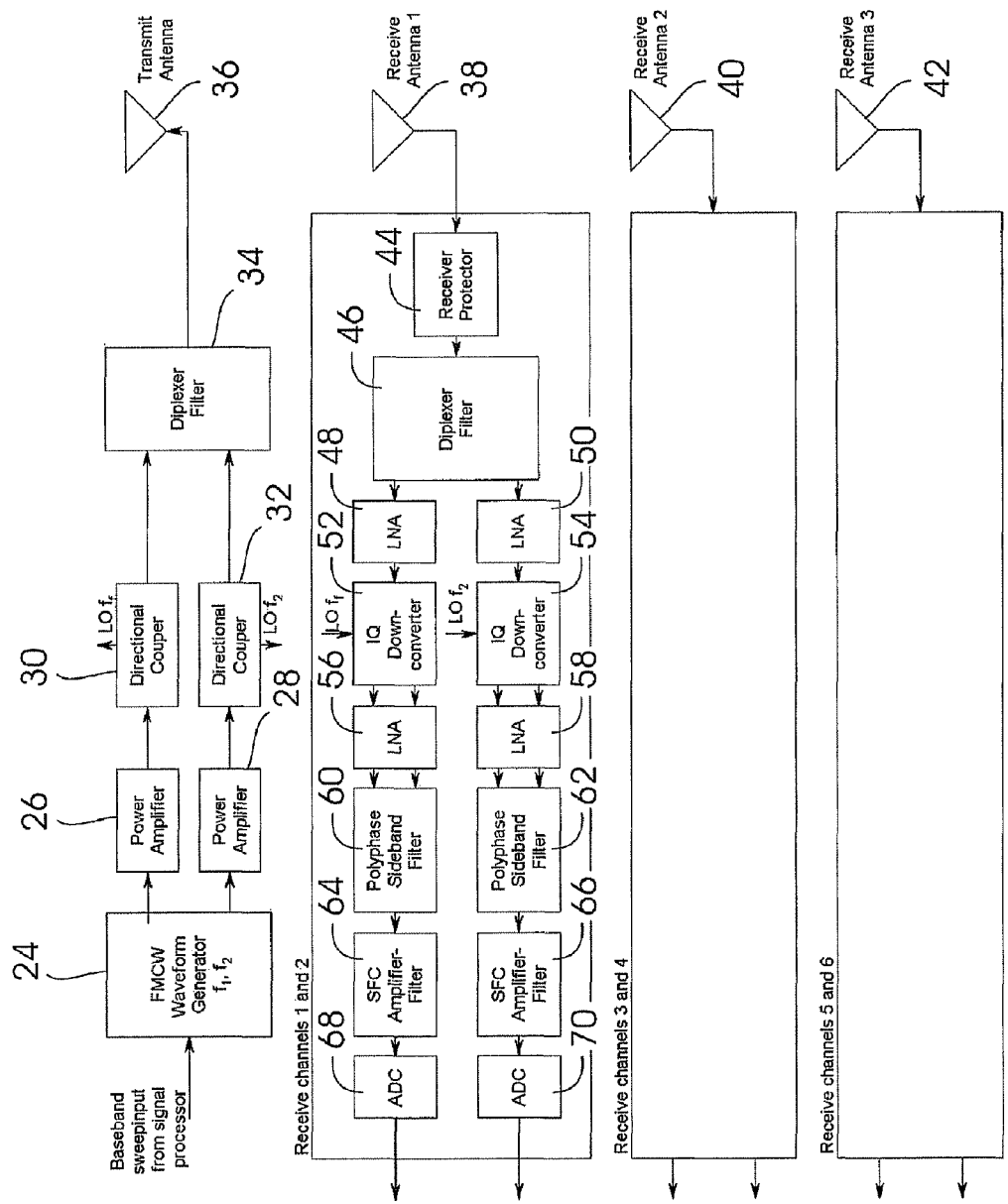
FIG. 7 is a block diagram of a transceiver for a floodlight radar system according to an example embodiment of the invention, with simultaneous receive channels.
Figure 8:
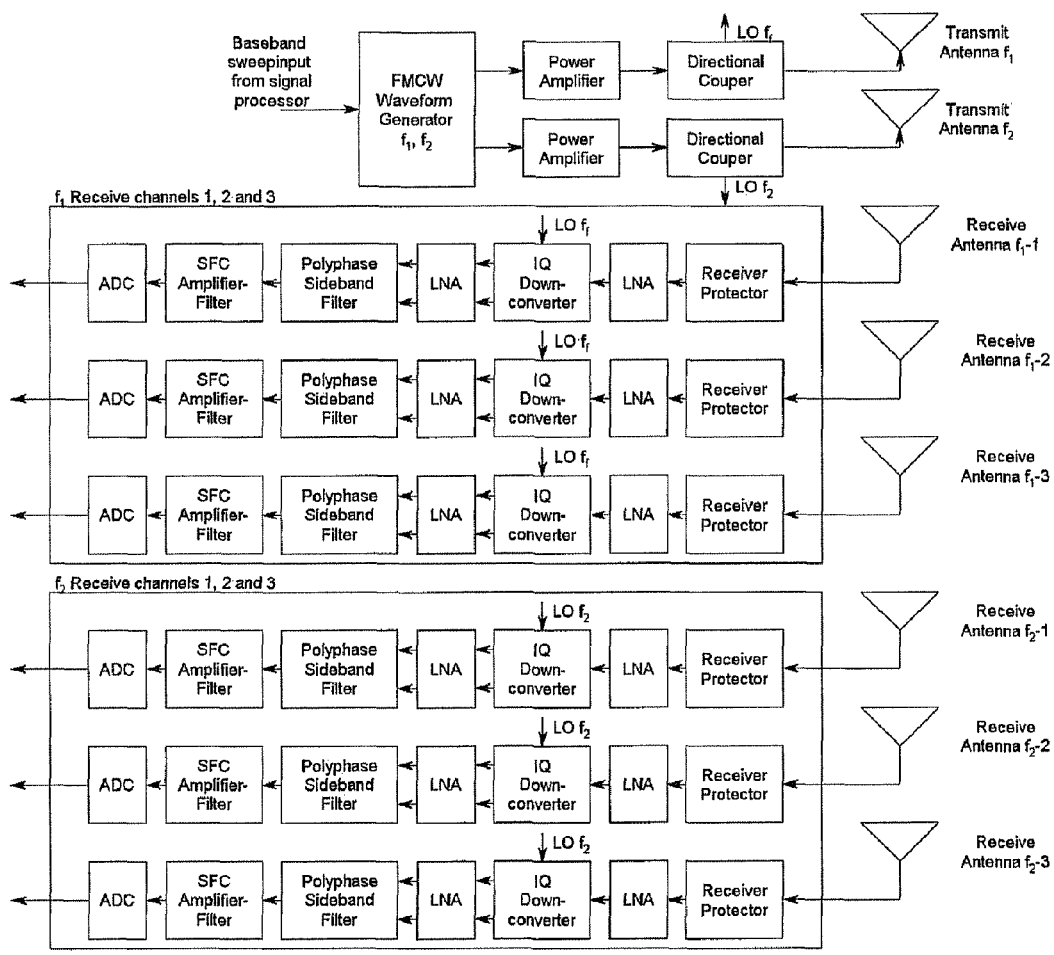
FIG. 8 is a block diagram of a transceiver for a floodlight radar system according to an example embodiment of the invention, with separate receive antenna arrays having separate receive channels.

Three block diagrams showing the implementation of an FMCW radar transceiver of a rapid location 3D radar system according to an example embodiment of the present invention are shown in FIGS. 6, 7 and 8. The principle of ambiguity resolution is equally applicable to a coherent pulsed radar system implementation.

FIG. 6 shows a multiplexed system with low hardware count, where the waveform generator generates alternating bursts at the frequencies $f_1$ and $f_2$. FIG. 7 shows an implementation with a six channel receiver and a shared receive antenna array, where the bursts at frequencies $f_1$ and $f_2$ are transmitted simultaneously. FIG. 8 shows an implementation with a six channel receiver fed by six receive antennas where the bursts at frequencies $f_1$ and $f_2$ are transmitted simultaneously. The implementations in FIGS. 7 and 8 are the preferred implementations if rapid detection of the target is a high priority. The less expensive implementation in FIG. 6 is suitable for applications where the rapid detection of a target is not such a high priority. The implementation in FIG. 8 has the advantage that the receive antennas may be separately optimised for each frequency, and that the losses associated with the diplexers are eliminated. The principle of operation of the three systems is the same.

With reference to FIG. 7, a waveform generator 24 generates two chirped up sweep FMCW signals simultaneously, starting at 9.1 and 10.1 GHz respectively, each with a sweep rate of 3.125 THz/s and a sweep repetition frequency of 49.135 kHz. The effective sweep bandwidth is 51.2 MHz and the range resolution of the radar is 2.93 m. The signals are amplified to a level of 1 W by means of power amplifiers 26 and 28. Two directional couplers 30 and 32 tap off local oscillator signals for the IQ down-converters in the receiver channels. The signals from the two power amplifiers are combined in a diplexer 34 and fed to the transmit antenna 36, which is a 17 dB gain pyramidal horn with a horizontal and vertical 3 dB beamwidths of 25°.

The echoes from the target are picked up by a receive array which consists of three horn antennas 38, 40 and 42 which are identical to the transmit antenna 36, arranged on the corners of an equilateral triangle with a horizontal base, and with an inter-antenna spacing of 192 mm, or 6.5λ at 10.1 GHz. The array can be tilted with its plane out of the vertical. The signals from the antennas are fed through PIN diode limiters 44 to the receivers where the two channels are separated with a diplexer filter 46.

The signal at $f_1$ is fed to a low noise amplifier 48 and IQ down-converter 52. The LO signal for the down-converter is a sample of the transmit signal for that channel, so that the intermediate frequency output signal from the down-converter is around zero frequency and known as a zero-frequency IF (ZIF). The IF signal is amplified by a low noise amplifier 56 and passed through a polyphase filter 60 that selects the lower sideband. A sensitivity-frequency control (SFC) and amplifier-filter circuit 64, that shapes the frequency response of the receive channel so as to reduce the sensitivity of the radar for close-by targets which produce low-frequency responses, amplifies the signal and low-pass filters it to band-limit the signal to less than 7.8 MHz. Finally, the band-limited is passed through an analogue to digital converter (ADC) 68 and the resulting digital signal is fed to the signal processor (see FIG. 9).

The $f_2$ signal from the diplexer is fed through an identical receiver channel 50, 54, 58, 62, 66 and 70 but fed with an LO signal at $f_2$. A further two identical pairs of receiver channels down-convert the signals from the antennas 40 and 42 to produce six IF output signals in total.

The Signal Processor

Figure 9:
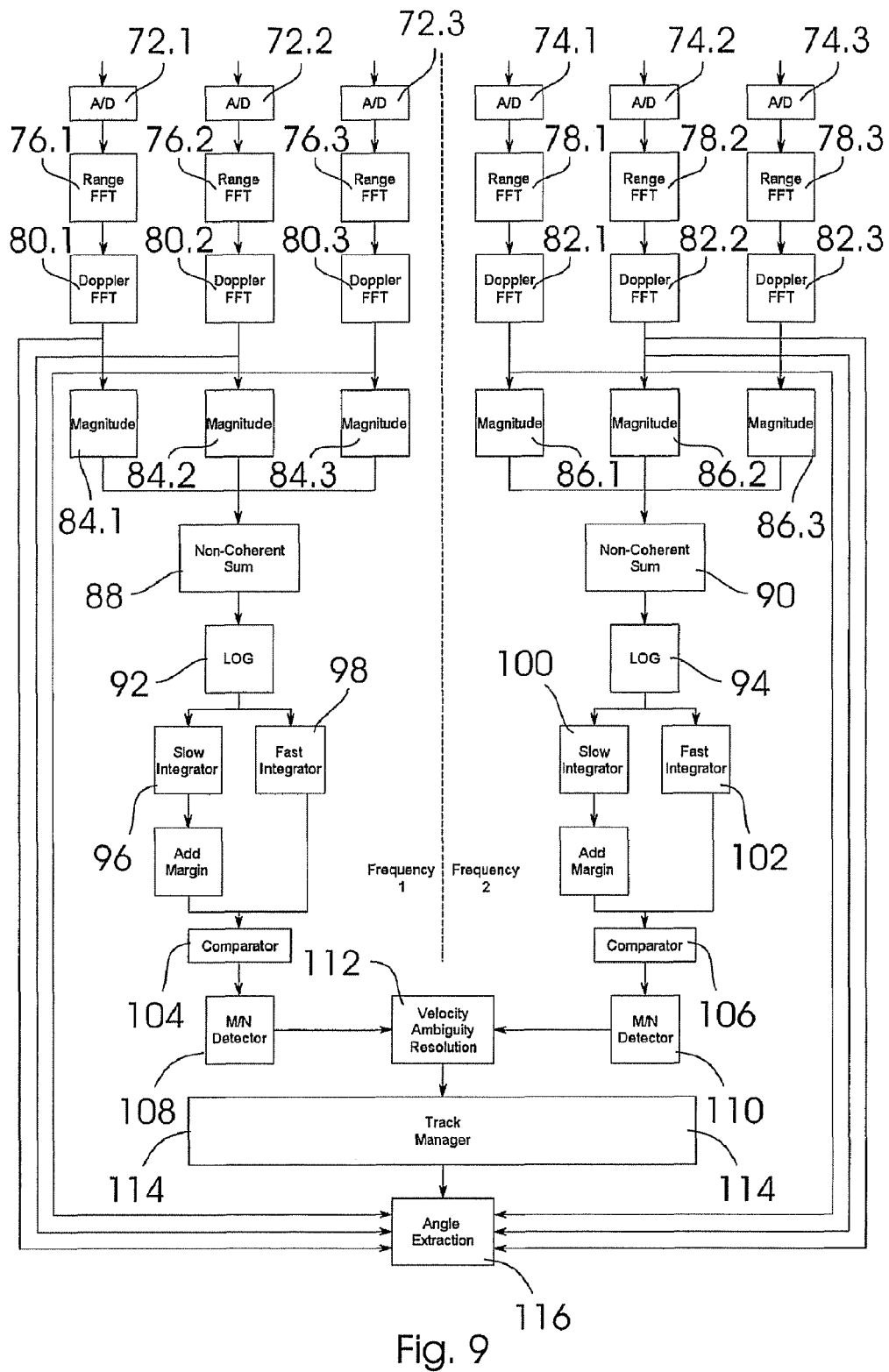
FIG. 9 is a block diagram of a signal processor used in conjunction with the transceiver of FIGS. 7 and 8.

A functional block diagram of the signal processor is shown in FIG. 9. The six IF signals from the three receiver channels are fed in at the top of the block diagram, to respective ADCs 72.1, 72.2, 72.3 and 74.1, 74.2, 74.3 where they are sampled. (The same ADCs are also shown in FIGS. 7 and 8). The respective samples are fed to an FFT process 76.1, 76.2, 76.3 and 78.1, 78.2, 78.3 to produce the 256 sample range FFT. The positive 128 bins of the range FFTs are fed to a second FFT process 80.1, 80.2, 80.3 and 82.1, 82.2, 82.3 to produce Doppler spectra for each of the 128 range bins and for each of the six channels. The output of these processes are a set of range-Doppler maps of complex numbers, of which the phase and magnitude values are calculated at 84.1, 84.2, 84.3 and 86.1, 86.2 and 86.3.

Detections are registered separately for each of the two frequencies by summing the magnitudes of the three range-Doppler maps for each antenna at each frequency, at 88 and 90, and taking the logarithm of the result at 92 and 94. This signal is then passed through a slow and a fast integrator 96, 98 and 100, 102 after which the slow signal is subtracted from the fast signal using a comparator 104 and 106 and passed to a threshold detector 108 and 110, and a binary integrator 112, to make an m out of n detection decision.

A specific target will produce different Doppler spectra at the two frequencies. The relationship between the Doppler spectra at the two frequencies is known and is consequently used to resolve velocity ambiguities and to distinguish between inbound and outbound targets. The information is then passed to a track manager 114 which rejects sporadic detections and establishes tracks on detections with compatible velocity and range sequences. Once a track is established, the phase differences between signals from the different antennas for that target are extracted at 116 from the range-Doppler maps for frequencies $f_1$ and $f_2$, and passed through smoothing filters to the ambiguity resolver which identifies the correct angle of arrival. Finally, azimuth and elevation angles, range, velocity, time-stamp, signal to clutter ratio and confidence parameter output is produced for each tracked target.

TYPICAL APPLICATIONS

The radar system described here has many potential applications.

Figure 10:
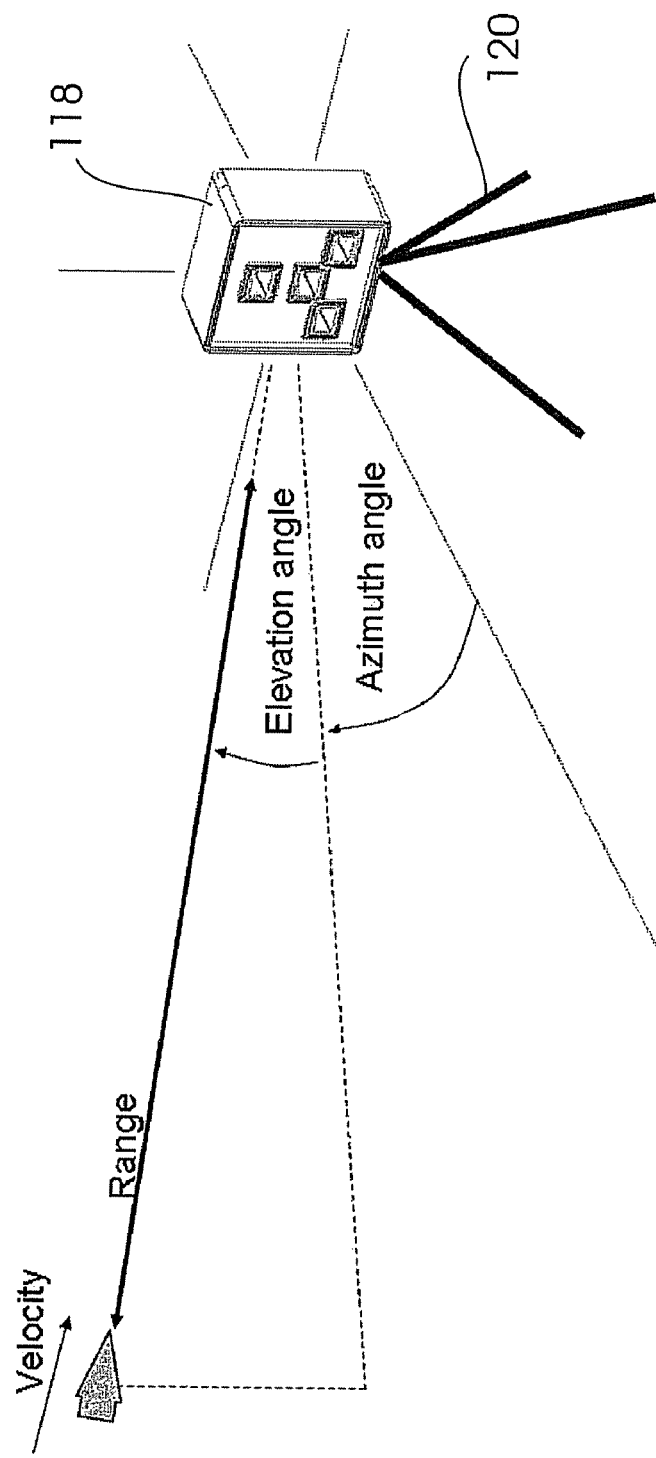
FIG. 10 is a simplified diagrammatic illustration of an example embodiment of a radar system according to the invention deployed as a radar that determines the trajectories of targets such as cricket balls and projectiles.

A first application is as a short range radar that can accurately measure the trajectories of objects such as cricket balls, projectiles, missiles and rockets, as shown in FIG. 10. The radar is located in a compact housing 118 which contains the antennas 36, 38, 40 and 42 and the associated electronics. The radar can conveniently be supported on a tripod 120 or other portable support structure, or could be mounted to a pole or other fixed structure.

Since the direction in which a cricket ball is going to be hit is unknown, the search volume can be set to include the full volume above a cricket field where a ball is likely to travel. The radar can locate the cricket ball within a few milliseconds after being hit. The radar location can then be used to direct a video camera at the ball for live TV coverage of the event, and also accurately report the speed with which the ball is travelling and also predict the point where the ball will hit the ground. A similar application would be to track projectiles at a test firing range or to track and determine the origin of small arms fire during peace-keeping operations.

Figure 11:
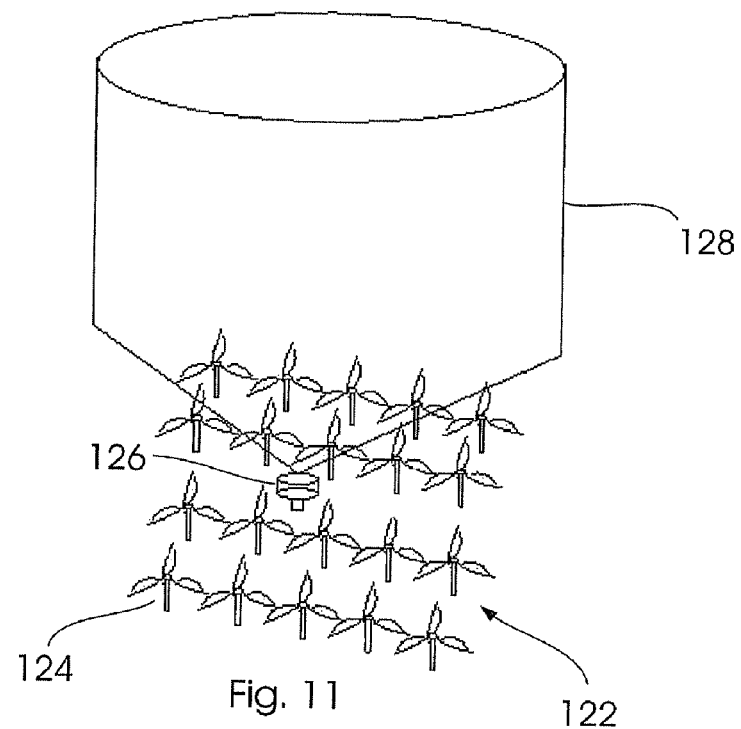
FIG. 11 is a simplified diagrammatic illustration of an example embodiment of a radar system according to the invention deployed as a gap-filler radar in a wind-farm.

With its ability to accurately determine the location of objects in space, a radar according to this invention is also excellently suited as a radar sensor to enable precision guidance of manned and unmanned aerial vehicles during take-off and landing. Another application is as a "gap-filler" radar, e.g. in a wind-farm, as shown in FIG. 11. Wind-farms present a hazard to air traffic control, as standard ATC radars cannot detect aircraft overflying wind farms reliably because of the limited observation time each time the antenna scans across the wind farm. The gap-filler radar, on the other hand, observes the turbine blades continuously and can distinguish between aircraft targets and turbine blades. In FIG. 11, a wind farm 122 has several wind turbines 124. A gap filler radar 126 according to the invention is located centrally in the wind farm, facing upwardly. The cylindrical coverage diagram of the radar is indicated by the numeral 128. The gap filler radar detects and reports aircraft overflying the wind farm to the ATC radar which is adversely affected by the wind-farm.

Figure 12:
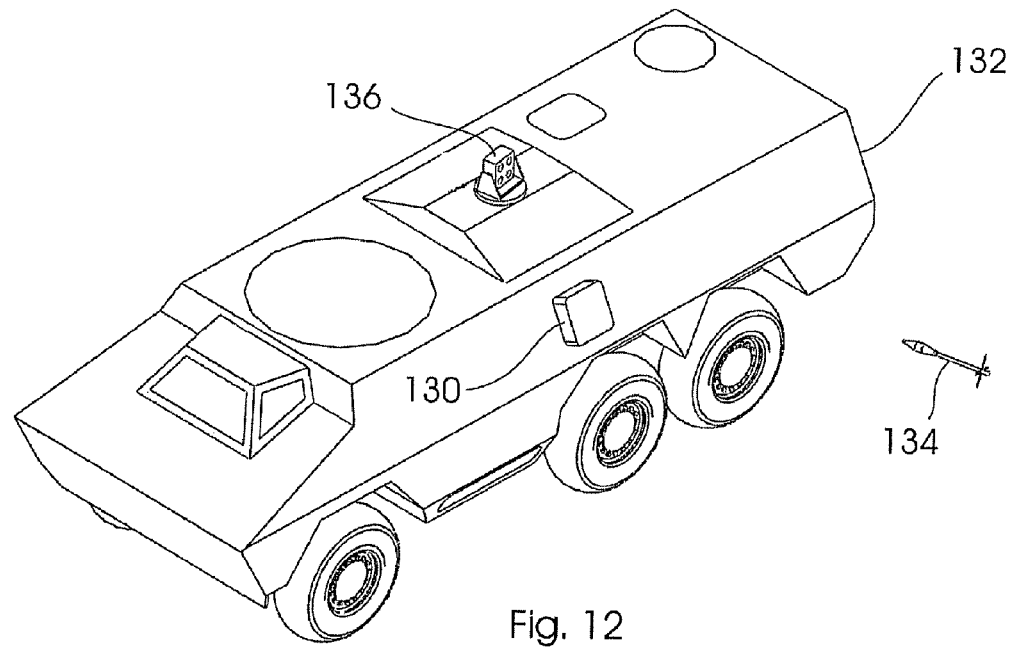
FIG. 12 is a simplified diagrammatic illustration of an example embodiment of a radar system according to the invention deployed as a sensor for an armoured vehicle protection system.

With its ability to rapidly detect and locate an incoming target, a radar according to the invention is excellently suited as a radar sensor for an armoured vehicle protection system, as shown in FIG. 12. The radar sensor unit 130 is mounted on the side of an armoured vehicle 132. On detection of an incoming projectile 134, such as a rocket propelled grenade, the location and trajectory of the projectile is sent to a countermeasures system 136 which directs a counter-projectile at the incoming grenade to destroy it before it reaches the armoured vehicle.

In summary, the above described floodlight radar system is able rapidly to detect and locate multiple fast moving targets in three dimensions. The radar continuously surveys a quarter hemisphere of space, and 3D target position is determined by a sparse interferometer array consisting of only three receive antennas arranged in two dimensions. Once a track is established, target angular ambiguities associated with sparse direction finding arrays are resolved by employing a frequency diversity waveform scheme. The radar generates a confidence parameter which flags unreliable measurements when multipath propagation or noise degrades the accuracy of a measurement.

The invention claimed is:

1. A floodlight radar system including:
   a. a transmitter arranged to generate output waveforms at first and second centre frequencies;
   b. at least one transmit antenna configured to illuminate a search volume constantly at the first and second centre frequencies;
   c. a sparse array of receive antennas arranged in a common plane and configured to monitor the search volume constantly;
   d. a receive circuit arranged to extract target position information from return signals received by each antenna; and
   e. a signal processor circuit arranged to resolve ambiguities in the position information using a known relationship between calculated Doppler spectra, wavelengths and phase differences at the first and second frequencies, to calculate azimuth, elevation, range and velocity of a target identified in the search volume.

2. The floodlight radar system of claim 1 wherein the sparse array of receive antennas comprises at least one set of three receive antennas.

3. The floodlight radar system of claim 2 wherein the sparse array of receive antennas comprises two sets of three receive antennas, one set for each centre frequency.

4. The floodlight radar system of claim 2 wherein said three receive antennas are arranged at the vertices of an equilateral triangle.

5. The floodlight radar system of claim 4 wherein the spacing between adjacent antennas is indicated by the expression $s=k\lambda$, where s is the spacing, $\lambda$ is the wavelength at the operating frequency of the antennas and k is a value larger than 1.

6. The floodlight radar system of claim 5 wherein k has a value between 1 and 5.

7. The floodlight radar system of claim 1 wherein the transmitter is arranged to produce a modulated continuous wave waveform.

8. The floodlight radar system of claim 7 wherein the transmitter is arranged to generate output waveforms at the first and second centre frequencies alternately.

9. The floodlight radar system of claim 8 wherein each receive antenna has a single receive channel capable of processing return signals at one or both centre frequencies alternately.

10. The floodlight radar system of claim 7 wherein the transmitter is arranged to generate output waveforms at the first and second centre frequencies simultaneously.

11. The floodlight radar system of claim 10 wherein each receive antenna has an associated pair of receive channels for the processing of return signals at the first and second centre frequencies simultaneously.

12. The floodlight radar system of claim 7 wherein, when using separate receive arrays for each frequency, each receive antenna has a single receive channel for the processing of return signals at either the first or second centre frequency.

13. The floodlight radar system of claim 1 wherein the signal processor is arranged to sample the return signals from each antenna at each of the two frequencies in the time domain.

14. The floodlight radar system of claim 13 wherein, in the case of a continuous wave waveform, the signal processor calculates the discrete Fourier spectrum of the signal, where each discrete component of the transform represents a range bin.

15. The floodlight radar system of claim 13 wherein the signal processor is arranged to calculate discrete Doppler spectra for each range bin from a large number of observations.

16. The floodlight radar system of claim 15 wherein the signal processor is arranged to detect targets by comparing the Doppler spectra for each range bin to the noise in the spectra when no target is present.

17. The floodlight radar system of claim 13 wherein the signal processor is arranged to accurately interpolate the range of the target by comparing amplitude returns from the target in adjacent range bins.

18. The floodlight radar system of claim 17 wherein the signal processor is arranged to accurately interpolate the radial velocity of the target by comparing amplitude returns from the target in adjacent Doppler bins.

19. The floodlight radar system of claim 1 wherein the signal processor circuit is arranged to associate each detected target with a track of its range and velocity information.

20. The floodlight radar system of claim 1 wherein the signal processor circuit is arranged to compare the phase returns of each detected target from each of the antennas, the respective phase differences being used to determine the angular location of each target in azimuth and elevation.

21. The floodlight radar system of claim 1 wherein the signal processor circuit is arranged to resolve angular ambiguities resulting from the wide antenna spacing by comparing the phase differences between measurements of the same target at the two centre frequencies.

22. The floodlight radar system of claim 21 wherein the signal processor circuit is arranged to use redundant information gained from the receiver channels to estimate and indicate the quality of the angular measurement.

23. The floodlight radar system of claim 1 wherein the signal processor is arranged to distinguish between inbound, outbound and other ambiguous velocities by comparing the Doppler spectra of the target at the two centre frequencies.

* * * * *